(12) United States Patent
Ichikawa et al.

(10) Patent No.: US 7,833,654 B2
(45) Date of Patent: Nov. 16, 2010

(54) ADHESIVE-CARRYING POROUS FILM FOR BATTERY SEPARATOR AND USE THEREOF

(75) Inventors: Tomoaki Ichikawa, Osaka (JP);
Keisuke Kii, Osaka (JP); Yoshihiro Uetani, Osaka (JP); Kazushige Yamamoto, Osaka (JP); Michio Satsuma, Osaka (JP); Mutsuko Yamaguchi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 1054 days.

(21) Appl. No.: 10/552,486

(22) PCT Filed: Apr. 1, 2004

(86) PCT No.: PCT/JP2004/004801
§ 371 (c)(1),
(2), (4) Date: Sep. 26, 2006

(87) PCT Pub. No.: WO2004/091014
PCT Pub. Date: Oct. 21, 2004

(65) Prior Publication Data
US 2007/0184340 A1    Aug. 9, 2007

(30) Foreign Application Priority Data
Apr. 9, 2003  (JP) .............................. 2003-104804
Feb. 4, 2004  (JP) .............................. 2004-027681

(51) Int. Cl.
*H01M 2/16* (2006.01)
*B32B 7/12* (2006.01)
(52) U.S. Cl. .................................. 429/144; 428/355 N
(58) Field of Classification Search ................. 429/144; 29/623.4; 428/355 N
See application file for complete search history.

(56) References Cited

U.S. PATENT DOCUMENTS 6,802,925 B2 * 10/2004  Kobayashi et al. .......... 156/234

2003/0215704 A1 * 11/2003  Satsuma et al. ............. 429/142

FOREIGN PATENT DOCUMENTS

| JP | 05-310988 | | 11/1993 |
|----|-----------|---|---------|
| JP | 09-012756 | | 1/1997 |
| JP | 09-161814 | | 6/1997 |
| JP | 11-329439 | | 11/1999 |
| JP | 2001-019786 | | 1/2001 |
| JP | 2001-131328 | | 5/2001 |
| JP | 2002-141045 | | 5/2002 |
| JP | 2003-119313 | * | 4/2003 |
| JP | 2004-143363 | | 5/2004 |
| JP | 2004-143371 | | 5/2004 |

OTHER PUBLICATIONS

International Search Report dated Jun. 29, 2004 in International (PCT) Application No. PCT/JP2004/004801.

* cited by examiner

*Primary Examiner*—Patrick Ryan
*Assistant Examiner*—Thomas H. Parsons
(74) *Attorney, Agent, or Firm*—Wenderoth, Lind & Ponack, L.L.P.

(57) ABSTRACT

The invention provides an adhesive-carrying porous film for use as a battery separator, comprising: a substrate porous film, wherein when a 1 mm diameter penetrating thermomechanical analyzer probe is placed on the film under a 70 g load to measure a thickness while heating the film from room temperature at a rate of 200° C./minute to a temperature where the film thickness decreases by half when the probe was initially placed is 200° C. or more, a partially crosslinked adhesive carried on the film, the adhesive is prepared by reacting a reactive polymer having a functional group capable of reacting with an isocyanate group with a polyfunctional isocyanate so the reactive polymer is partially crosslinked, a porous film is temporarily bonded to an electrode to provide an electrode/separator laminate, the porous film in a battery functions as a separator which does not melt or break with small heat shrinkage under high temperatures.

7 Claims, No Drawings

ADHESIVE-CARRYING POROUS FILM FOR BATTERY SEPARATOR AND USE THEREOF

TECHNICAL FIELD

The present invention relates to an adhesive-carrying porous film for use as a battery separator. The adhesive-carrying porous film is useful for manufacturing a battery and, it functions as a separator which does not melt or break, and has a small heat shrinkage even under a high temperature environment in a battery thus manufactured and therefore which has a superior safety. The invention further relates to a method of manufacturing a battery employing such an adhesive-carrying porous film.

BACKGROUND ART

Conventionally, as described in, for example, Japanese Unexamined Patent Publications No. 09-161814 and 11-329489, a method of manufacturing a battery has been known in which a cathode or a positive electrode and an anode or a negative electrode are laminated while holding a separator between the electrodes for the purpose of preventing a short circuit therebetween to form an electrode/separator laminate, or in which a cathode (or an anode), a separator, an anode (or a cathode) and a separator are laminated in this order, and the laminate is wound up to form an electrode/separator laminate; and then the electrode/separator laminate thus prepared is charged into a battery container, an electrolytic solution is poured into the battery container; and then the container is sealed.

However, in such a method of manufacturing a battery, the electrode and the separator are liable to cause mutual slip movement during storage or transport of the electrode/separator laminate. As a result, the problems are that the productivity of a battery is low and that inferior goods are liable to occur. Further, according to the battery thus obtained, the electrode swells or shrinks during use thereof, so that adhesiveness between the electrode and the separator becomes worse, leading to a reduction in battery characteristics, or an internal short circuit occurs, whereby the battery causes heat generation and temperature rise, occasionally leading to even the possibility of causing melting and breakage of the separator.

Conventionally, various methods of manufacturing a porous film for use as such a separator in manufacturing of a battery have been known. As one of the methods, as described in, for example, Japanese Unexamined Patent Publication No. 09-012756, a method is known in which a sheet is manufactured from a gel composition comprising a ultra-high molecular weight polyolefin resin and a polyolefin resin with a high molecular weight distribution (weight average molecular weight/number average molecular weight) and stretched in a high ratio. However, such a battery separator made of a porous film obtained by stretching in a high ratio still has a notable heat shrinkability under a high temperature environment such as the case where the battery causes an abnormal temperature rise by an internal short circuit and the like, and according to the circumstances, the problem is that the battery separator suffers melting and breakage so that it does not function as a diaphragm between electrodes.

In order to improve the safety of a battery, it is an important issue to both improve the heat resistance and reduce the heat shrinkage factor of the battery separator under such a high temperature environment. As to this issue, in order to control the heat shrinkage of the battery separator under a high temperature environment, as described in, for example, Japanese Unexamined Patent Publication No. 05-310989, a method is also known in which a ultra-high molecular weight polyethylene and a plasticizer are melt-kneaded, the mixture is extruded into a sheet from a die, and the plasticizer is then extracted and removed to provide a porous film for use as a battery separator.

The porous film obtained by this method does not melt or break even under a high temperature environment and is superior in heat resistance; however, contrary to the above-described method, the film has not been subjected to stretching in manufacturing processes, and therefore the strength is not sufficient and the problem of heat shrinkage is not improved. Thus, a porous film for use as a separator which does not melt or break, and has a small heat shrinkage factor under a high temperature environment has not conventionally been known.

The present invention has been completed to solve the problems as described above in the conventional manufacture of a battery. Therefore, it is an object of the invention to provide an adhesive-carrying porous film for use as a battery separator, which, in manufacturing a battery, is useful for efficient manufacture of a battery as it forms an electrode/separator laminate comprising an electrode and a separator temporarily bonded to each other so that there is caused no mutual slip movement between the electrode and the separator and which itself, after manufacturing a battery, functions as a separator which does not melt or break, and has a small heat shrinkage under high temperatures. Furthermore, it is another object of the invention to provide a method of manufacturing a battery by using such an adhesive porous film.

DISCLOSURE OF THE INVENTION

According to the invention, there is provided an adhesive-carrying porous film for use as a battery separator, which comprises:

a substrate porous film such that when a probe of a probe penetrating thermomechanical analyzer, said probe having a diameter of 1 mm, is placed on the porous film under a load of 70 g to measure a thickness thereof while heating the porous film from room temperature at a rate of 2° C./minute, a temperature at which the thickness of the porous film decreases to a half of the thickness of the porous film when the probe was initially placed thereon is 200° C. or more; and a partially crosslinked adhesive carried on the substrate porous film, the partially crosslinked adhesive being prepared by reacting a reactive polymer having a functional group capable of reacting with an isocyanate group therein with a polyfunctional isocyanate so that the reactive polymer is partially crosslinked.

In particular, according to the invention, it is preferred that the substrate porous film is made of a polyolefin resin composition comprising a polyolefin resin having a weight average molecular weight of at least 500000 and a crosslinked product of a cross-linkable rubber having a double bond in the molecular chain.

Also, according to the invention, there are provided an electrode/porous film laminate comprising an electrode pressure-contacted or temporarily adhered to the adhesive-carrying porous film, and an electrode/porous film adherend comprising an electrode adhered or bonded to the porous film obtained by reacting and further crosslinking the partially crosslinked adhesive in the electrode/porous film laminate with a polyfunctional isocyanate.

Further according to the invention, there is provided a method of manufacturing a battery which comprises: charging the electrode/porous film laminate into a battery container and then pouring an electrolytic solution containing a polyfunctional isocyanate into the battery container; and heating the laminate to react with the polyfunctional isocyanate to further crosslink an unreacted reactive polymer in the partially crosslinked adhesive carried on the porous film thereby bonding the electrode to the porous film to form an electrode/porous film adherend and obtaining a battery which has as a separator the porous film in the electrode/porous film adherend thus formed.

The adhesive-carrying porous film for use as a battery separator of the invention comprises a substrate porous film and a partially crosslinked adhesive prepared by reacting a reactive polymer having a functional group capable of reacting with an isocyanate group therein with a polyfunctional isocyanate so that the reactive polymer is partially crosslinked. Herein the invention, the substrate porous film is made of a polyolefin resin composition comprising a polyolefin resin having a weight average molecular weight of at least 500000 and a crosslinked product of a cross-linkable rubber having a double bond in the molecular chain.

The porous film on which a partially crosslinked reactive polymer is carried has adhesive properties due to the partially crosslinked adhesive. Accordingly, when an electrode is put along the porous film, preferably pressed against the porous film while being heated, the electrode can easily be bonded temporarily to the porous film, or press-contacted to the porous film. Thus, according to the invention, in manufacturing a battery, such a product can be used as an electrode/porous film (separator) laminate with no mutual slip movement between the electrode and the porous film (the separator), thereby making it possible to manufacture a battery efficiently.

Furthermore, even when such a laminate is charged into a battery container and an electrolytic solution is poured into the battery container, temporary bonding between an electrode and the porous film (a separator) is retained, and additionally an reactive polymer in the partially crosslinked adhesive is a partially crosslinked polymer and thereby is prevented or reduced from being eluted in the electrolytic solution. Accordingly, in manufacturing a battery, an unreacted reactive polymer in the partially crosslinked adhesive is further crosslinked to bond the electrode to the porous film more firmly with close adhesion therebetween, thereby forming an electrode/separator adherend.

In addition, the porous film in the adhesive-carrying porous film is preferably made of a polyolefin resin composition which comprises a polyolefin resin having a weight average molecular weight of at least 500000 and a crosslinked product of a cross-linkable rubber having a double bond in the molecular chain, so that the porous film has a heat-resistant temperature of 200° C. or more. Therefore, after manufacturing a battery, the porous film itself functions as a separator which does not melt or break, and has a small heat shrinkage under high temperatures. Thus, the use of the adhesive-carrying porous film of the invention makes it possible to manufacture a battery which has a superior safety at high temperatures.

BEST MODE FOR CARRYING OUT THE INVENTION

The adhesive-carrying porous film for use as a battery separator according to the invention comprises:

a substrate porous film such that when a probe of a probe penetrating thermomechanical analyzer, said probe having a diameter of 1 mm, is placed on the porous film under a load of 70 g to measure a thickness thereof while heating the porous film from room temperature at a rate of 2° C./minute, a temperature (hereunder referred to as the heat resistant temperature of the porous film) at which the thickness of the porous film decreases to a half of the thickness of the porous film (hereunder referred to as the initial thickness of the porous film) when the probe was initially placed thereon is 200° C. or more; and a partially crosslinked adhesive carried on the substrate porous film, the partially crosslinked adhesive being prepared by reacting a reactive polymer having a functional group capable of reacting with an isocyanate group therein with a polyfunctional isocyanate so that the reactive polymer is partially crosslinked.

The substrate porous film is preferably made of a polyolefin resin composition comprising a polyolefin resin having a weight average molecular weight of at least 500000 and a crosslinked product of a cross-likable rubber having a double bond in the molecular chain.

That is, according to the invention, a partially crosslinked adhesive obtained by reacting a reactive polymer having a functional group capable of reacting with an isocyanate group with a polyfunctional isocyanate so that it is partially crosslinked is carried on a substrate porous film having the heat characteristics as described above thereby providing an adhesive-carrying porous film for use as a battery separator. When a battery is manufactured in which such a porous film is incorporated so that it functions as a separator as described later, the separator has a small heat shrinkage and maintains its thickness without easily melting or breaking even under high temperatures, thereby fully preventing abort circuit between electrodes, so that the safety of the battery is improved.

The measurement of a thickness of a substrate porous film by using a probe penetrating thermomechanical analyzer is described in detail. First, when the tip of a cylindrical probe having a diameter of 1 mm is placed on a porous film with a load applied to the probe, the porous film is somewhat decreased in thickness at a portion where the porous film is contacted with the tip of the probe on account of the load applied to the probe. The thickness of the porous film at this time is referred to as the initial thickness of porous film. Thereafter, as the temperature of the porous film rises, the thickness is decreased little by little, and a phenomenon is observed such that the thickness is greatly decreased when a resin of which the porous film is composed is melted or semi-melted and then the thickness is somewhat recovered due to the later shrinkage. When the porous film continues to be further heated, the thickness starts to be decreased again after being increased due to the above-mentioned shrinkage. Thus, according to the invention, the temperature of the porous film at which the thickness of the porous film continues to be decreased to a half of the above-mentioned initial thickness is defined as a heat-resistant temperature of the porous film.

The higher heat-resistant temperature allows the porous film to maintain a thickness thereof without melting or breaking up to higher temperatures, and therefore the use of such a porous film as a separator makes it possible to obtain a battery which has a superior safety under a high temperature environment.

According to the invention, therefore, a substrate porous film is not particularly limited if it has solvent resistance and oxidation-reduction resistance in addition to the above-mentioned heat characteristics. For example, a porous film comprising a polyolefin resin such as polyethylene, polypropylene and polybutylene, polyamide, cellulose acetate or polyacrylonitrile may be used.

However, according to the invention, a porous film made of a polyolefin resin composition comprising a polyolefin resin having a weight average molecular weight of 500000 or more and a crosslinked product of a cross-linkable rubber having a double bond in the molecular chain is in particular preferably used as a substrate porous film. The polyolefin resin composition may contain as required a polyolefin resin or a thermoplastic elastomer having a weight average molecular weight of less than 500000.

Examples of the polyolefin resin having a weight average molecular weight of 500000 or more include polyolefin resins such as polyethylene and polypropylene. An upper limit to the weight average molecular weight of the polyolefin resin is not particularly limited, but it is usually about 8000000. These polyolefin resins may be used singly or in a mixture of two kinds or more. According to the invention, however, among these, ultra-high molecular weight polyethylene resin having a weight average molecular weight of 500000 or more is preferably used particularly for the reason that a porous film of high strength is obtained.

As the cross-linkable rubber, a diene polymer having double bonds in the molecule such as polybutadiene or polyisoprene, or a ternary copolymer having a double bond in the molecule such as ethylene-propylene-diene monomer is preferably used. In an ethylene-propylene-diene monomer ternary copolymer, examples of the diene monomer include dicyclopentadiene, ethylidene norbornene or hexadiene, and among these, ethylidene norbornene is preferably used in view of crosslinking reactivity of the resulting ternary copolymer. That is, a ternary copolymer having ethylidene norbornene as a component is superior in crosslinking reactivity, so that the heat resistance of a porous film obtained is improved more securely. A ternary copolymer having ethylidene norbornene as a component as mentioned above has an alicyclic structure and double bonds derived from the diene monomer, and a ternary copolymer in which a part of the double bonds are hydrogenated can also be used. The ternary copolymers may be any of a random polymer, a block polymer and a graft polymer. Such ternary copolymers are commercially available as various kinds of EPDM.

In order to sufficiently crosslink such a ternary copolymer, the proportion of a diene monomer component in a ternary copolymer is preferably 3% by weight or more on the basis of a total weight of ethylene, propylene and diene monomer, particularly preferably a range of 4 to 20% by weight. In particular, according to the invention, a ternary copolymer in which the proportion of ethylene/propylene/diene monomer components is 0.5 to 0.75/0.05 to 0.47/0.03 to 0.2 in weight ratio is preferably used.

Polynorbornene which is a ring-opening polymer of norbornene is a polymer having double bonds in the molecule and a glass transition point of about 35° C. The polymer itself is not rubbery; however, a composition comprising oils such as aromatic oil, naphthenic oil or paraffinic oil has a glass transition point of about –60° C. and having properties as an elastic body, and is used as a modifier for various kinds of rubbers. In the present invention, it can be used as a cross-linkable polymer so appropriately as to be included in the above-mentioned cross-linkable rubber.

Examples of the polyolefin resin having a weight average molecular weight of less than 500000 include polyolefin resins such as polyethylene and polypropylene, and modified polyolefin resins such as an ethylene-acrylic monomer copolymer and an ethylene-vinyl acetate copolymer. Examples of the thermoplastic elastomer include thermoplastic elastomers such as polystyrene, polyolefin, polydiene, vinyl chloride and polyester elastomers. A lower limit to the weight average molecular weight of such a polyolefin resin having a weight average molecular weight of less than 500000 is not particularly limited, but it is usually about 20000. These polyolefin resins and thermoplastic elastomers may be used singly or together in two kinds or more. A thermoplastic elastomer having double bonds in the molecule among the above-mentioned thermoplastic elastomers can also be used as a cross-linkable rubber.

According to the invention, among these, a polyolefin resin having a weight average molecular weight of less than 500000 is preferably a polyethylene resin having a low melting point, a polyolefin elastomer having crystallinity and a graft copolymer having in its side chains polymethacrylates having a low melt temperature in view of bringing low shutdown temperature.

As described above, according to the invention, a substance porous film made of a polyolefin resin composition comprising a polyolefin resin having a weight average molecular weight of 500000 or more and a crosslinked product of a cross-linkable rubber having double bonds in its molecular chain is preferably used. Herein the invention, it is preferred that the proportion of the polyolefin resin in the polyolefin resin composition is in a range of 5 to 95% by weight in consideration of the strength of the porous film obtained from the polyolefin resin composition and the balance with other components, particularly preferably a range of 10 to 90% by weight. On the other hand, the proportion of the cross-linkable rubber in the polyolefin resin composition is 3% by weight or more, particularly preferably in a range of 5 to 35% by weight.

When the proportion of the cross-linkable rubber in the polyolefin resin composition is less than 3% by weight, there is a possibility that the resulting porous film is not sufficiently improved in heat resistance even after crosslinking of the cross-linkable rubber.

Further according to the invention, the polyolefin resin composition for manufacturing a porous film may contain as required a polyolefin resin or a thermoplastic elastomer having a weight average molecular weight of less than 500000. In this case, the proportion of a polyolefin resin or a thermoplastic elastomer having a weight average molecular weight of less than 500000 is preferably in a range of 1 to 50% by weight in the total quantity of the polymer composition. The containing of such components in the substrate porous film allows a porous film to be obtained to have a shutdown function at lower temperatures.

The manufacture of the porous film described above, made of a polyolefin resin composition comprising a polyolefin resin having a weight average molecular weight of at least 500000 and a cross-linkable rubber having double bonds in the molecular chain is now described. Such a porous film can be obtained by forming a film by suitable methods such as a known dry film forming method or a known wet film forming method and then crosslinking the cross-linkable rubber in the film.

More specifically, for example, the polyolefin resin composition is mixed with a solvent, kneaded and dissolved in the solvent with heating to form a kneaded product in a slurry state, the kneaded product is molded into a sheet by using a suitable means, the sheet is rolled, and is then subjected to uniaxial or biaxial stretching to form a film. The solvent used is desolvated or removed by extraction from the sheet to provide a porous film. Then, the cross-linkable rubber in the porous film is crosslinked by making use of double bonds that the cross-linkable rubber possesses thereby providing the porous film with necessary heat resistance.

In the manufacture of a porous film, the kneaded product in a slurry state is prepared by using a solvent such as aliphatic or alicyclic hydrocarbons. Some examples are nonane, decane, undecane, dodecane, decalin or liquid paraffin, and additionally a mineral oil fraction whose boiling point corresponds to that of these mediums; among them, a nonvolatile solvent containing an alicyclic hydrocarbon such as liquid paraffin in large quantities is preferably used.

The proportion of the polyolefin resin composition in the kneaded product in a slurry state is preferably in a range of 5 to 30% by weight, more preferably a range of 10 to 30% by weight and most preferably a range of 10 to 25% by weight. That is, the proportion of the above-mentioned polyolefin resin composition in the kneaded product in a slurry state is preferably 5% by weight or more from the viewpoint of improving the strength of the porous film obtained, meanwhile preferably 30% by weight or less so that a polyolefin resin having a weight average molecular weight of 500000 or more can be dissolved sufficiently in a solvent and kneaded almost up to a state in which polymer chains are stretched to full length so that they are sufficiently entangled. The kneaded product may contain an additive such as an antioxidant, an ultraviolet absorbing agent, dyestuff, a nucleating agent, pigment or an antistatic agent if necessary within a range where the object of the invention is not deteriorated.

Conventionally known methods may be used for mixing and kneading the polyolefin resin composition and the solvent to prepare the kneaded product in a slurry state and molding the kneaded product to a sheet. By way of examples, the polyolefin resin composition and the solvent are kneaded in a batch system by using a Banbury mixer or a kneader to provide a kneaded product, and the kneaded product is made into a sheet by rolling it through a pair of cooled rolls or holding it between a pair of cooled metal plates thereby to rapidly cool and crystallize it. Alternatively, the kneaded product may be molded into a sheet by using an extruder mounted with a T die. The temperature at which the polyolefin resin composition and the solvent are kneaded is not particularly limited, but it is preferably in a range of 100 to 200° C.

The thickness of a sheet thus obtained is not particularly limited, but it is usually in a range of 3 to 20 mm. The thus obtained sheet may be rolled to have a thickness of 0.5 to 3 mm by using a heat press. The rolling is preferably performed at a temperature of 100 to 140° C. A method of stretching the obtained sheet is not particularly limited, and an ordinary tenter method, a roll method, tubular film process or a combination of these may be used. Either method of uniaxial or biaxial stretching may also be used. In the case of biaxial stretching, either of simultaneous or successive stretching in length and breadth will do. The temperature at which the stretching treatment is carried out is preferably in a range of 100 to 140° C.

Desolvating or solvent-removing treatment is a treatment such that the solvent used for preparation of kneaded product is removed from the sheet to form a porous structure, and can be performed, for example, by washing the sheet with a suitable second solvent to remove the solvent remained in the sheet. The following are used as the solvent for desolvating: easily volatile solvent such as hydrocarbons such as pentane, hexane, heptane and decane, chlorinated hydrocarbons such as methylene chloride and carbon tetrachloride, fluorohydrocarbon such as ethane trifluoride, ethers such as diethyl ether and dioxane, alcohols such as methanol and ethanol, and ketones such as acetone and methyl ethyl ketone. These are used singly or in a mixture of two kinds or more. Desolvating treatment of a sheet by using such solvent is performed, for example, by immersing a sheet in such a solvent or showering a sheet with such a solvent.

According to the invention, after a porous film has been obtained from the polyolefin resin composition in this manner, heat treatment is preferably performed on the porous film in order to reduce its heat shrinkability. The heat treatment may be single-stage treatment such as to heat a porous film once, or multistage treatment such as to heat at comparatively low temperatures at first and subsequently heat at higher temperatures. The heat treatment may be warm-up treatment such as to heat a porous film while warming up. However, it is desired that the heat treatment is performed so as not to deteriorate the desirable original properties of the porous film, such as air permeability.

In the case of the single-stage heat treatment, heating temperature therein is preferably in a range of 40 to 140° C., depending on the composition of a porous film. Warm-up or multistage heat treatment such as to start heating from comparatively low temperatures and thereafter raise heating temperature can serve also for a cross-linkable rubber to crosslink in a porous film to gradually improve heat resistance of the porous film. Moreover, the warm-up or multistage heat treatment can perform necessary heat treatment in a short time without deteriorating the desirable original properties of the porous film such as air permeability by heating, and thus it is a heat treatment preferably employed. In the multistage heat treatment, in particular, the initial heating temperature is preferably in a range of 40 to 90° C., depending on the composition of a porous film, and heating temperature at the second stage is preferably in a range of 90 to 140° C., depending on the composition of a porous film.

According to the invention, in order to improve the heat resistance of a porous film obtained, the cross-linkable rubber in a porous film is crosslinked in the heat treatment process, or before or after it, as described above. Such crosslinking of the cross-linkable rubber can markedly improve the heat resistance (breakage resistance) of a porous film obtained at high temperatures. As described above, it is preferable also from the viewpoint of productivity to crosslink the cross-linkable rubber in a porous film during the heat treatment of a porous film. Thus, the crosslinking of the cross-linkable rubber in a porous film in this manner, serving also as heat treatment of a porous film, can reduce heat shrinkability of a porous film and simultaneously markedly improve the heat resistance of a porous film.

In order to crosslink the cross-linkable rubber in a porous film obtained, it is preferred that the porous film is heated in the presence of oxygen, ozone or oxygen compounds to perform a crosslinking reaction for cross-linkable rubber, and above all, it is preferable that cross-linkable rubber is crosslinked by heating a porous film in the presence of oxygen, accordingly, for example, in the air, or irradiating with ultraviolet rays or electron rays. If necessary, the use of conventionally known peroxide compounds together-therewith also allows an intended crosslinking reaction to be promoted. Needless to say, plural crosslinking methods may be used together as required.

In the present invention, the substrate porous film functions as a separator in batteries after they have been manufactured so that it has a thickness preferably in a range of 1 to 60 µm, more preferably in a range of 5 to 50 µm. A film thickness thinner than 1 µm makes the strength of the porous film insufficient and brings the possibility of causing an internal short circuit when being used as a separator in a battery, while a film thickness thicker than 60 µm makes a distance between the electrodes too long and brings excessive internal resistance of a battery. A substrate porous film has pores of an average pore diameter of 0.01 to 5 µm, whose porosity is preferably in a range of 20 to 80%, more preferably 25 to 75%. In addition, a substrate porous film has an air permeability in a range of 100 to 1000 seconds/100 cc, more preferably in a range of 100 to 900 seconds/100 cc, as measured in conformity to JIS P 8117.

The adhesive-carrying porous film for use as a battery separator according to the invention comprises a substrate porous film and a partially crosslinked adhesive carried thereon. The partially crosslinked adhesive is obtained by reacting a reactive polymer having a functional group capable of reacting with an isocyanate group with a polyfunctional isocyanate so that it is partially crosslinked. According to the invention, it is preferred that the partially crosslinked adhesive is carried on a substrate porous film in a range from 5 to 95% of the surface area of the porous film. It is also preferred that the partially crosslinked adhesive has a gel fraction in a range of 5 to 80%.

As described hereinabove, a reactive polymer is partially crosslinked to provide a partially crosslinked adhesive. The partially crosslinked adhesive has adhesive properties. Thus, the adhesive-carrying porous film that carries such a partially crosslinked adhesive thereon can be bonded temporarily to electrodes to form an electrode/porous film laminate. The electrode/porous film laminate is such that even if it is contacted with an electrolytic solution in manufacturing a battery, the reactive polymer therein is prevented or reduced from being eluted in the electrolytic solution since it has been partially crosslinked, so that the reactive polymer can effectively be used for bonding the electrode to the porous film and thus the electrode can be bonded more firmly to the porous film.

According to the invention, the reactive polymer preferably has carboxyl groups or hydroxyl groups as a functional group having active hydrogen capable of reacting with an isocyanate group. More specifically, it is preferred that the reactive polymer comprises monomer components having the above-mentioned functional group together with a (meth)acrylate monomer component.

More specifically, the reactive monomer includes, for example, carboxyl group-containing copolymerizable monomers such as (meth)acrylic acid, itaconic acid or maleic acid, and preferably (meth)acrylic acid among these, hydroxyl group-containing copolymerizable monomers, preferably hydroxyalkyl (meth)acrylates such as 2-hydroxyethyl (meth)acrylate, 2-hydroxypropyl (meth)acrylate or 4-hydroxybutyl (meth)acrylate. In addition thereto, however, a copolymerizable monomer having an amino group may also be used as a reactive monomer.

As (meth)acrylates, alkyl esters having an alkyl group with 1 to 12 carbon atoms are preferably used, such as ethyl (meth)acrylate, butyl (meth)acrylate, propyl (meth)acrylate, isooctyl (meth)acrylate, 2-ethylhexyl (meth)acrylate and dodecyl (meth)acrylate.

In the invention, it is preferred that a reactive polymer has a reactive monomer component as described above in a range of 0.1 to 20% by weight and a (meth)acrylate component, as required, a copolymerizable monomer component having a nitrile group, preferably a (meth)acrylonitrile component and a vinyl monomer component such as styrene, α-methyl styrene or vinyl acetate. In particular, it is preferred that a reactive polymer has a copolymerizable monomer component having a nitrile group, preferably a (meth)acrylonitrile component in a range of up to 80% by weight, preferably in a range of 5 to 70% by weight, so as to be superior in heat resistance and solvent resistance. When a reactive polymer has a proportion of a copolymerizable monomer component having a nitrile group less than 6% by weight, the resulting reactive polymer is little improved in heat resistance and solvent resistance, while when a reactive polymer has a proportion more than 80% by weight, the resulting reactive polymer occasionally has a glass transition temperature of undesirably higher than 100° C. It is particularly preferred that a reactive polymer comprises 0.1 to 20% by weight of a reactive monomer component, 10 to 95% by weight of a (meth)acrylate component and 4.9 to 60% by weight of (meth)acrylonitrile component.

However, the reactive polymer is not limited to the above exemplified, but the reactive polymer may be a polymer that has a functional group capable of reacting with an isocyanate group, such as active hydrogen. Accordingly, for example, a polyolefin-based polymer, a rubber-based polymer or a polyether-based polymer having a functional group capable of reacting with an isocyanate group may also be used as a reactive polymer. In addition, acrylic modified fluororesin having a hydroxyl group in the molecule (for example, CEFRAL COAT FG730B manufactured by Central Glass Co., Ltd., which is available as a varnish) may also be appropriately used as a reactive polymer.

Further, a reactive polymer has a glass transition temperature preferably in a range of 0 to 100° C., more preferably a range of 20 to 100° C.

The reactive polymer may be obtained as a polymer solution by copolymerizing the monomers as described above in a solvent such as benzene, toluene, xylene, ethyl acetate or butyl acetate. On the other hand, an emulsion polymerization method provides an aqueous dispersion of a reactive polymer. The reactive polymer is then separated from the dispersion, dried and then dissolved in the solvents as described above so that it is used as a polymer solution. When the emulsion method is employed, polyfunctional cross-linkable monomers such as divinylbenzene or trimethylolpropane triacrylate may be used in a proportion of 1% by weight or less in addition to the above-mentioned monomers.

Examples of preferred polyfunctional isocyanates include aromatic, araliphatic, alicyclic or aliphatic diisocyanates such as phenylene diisocyanate, tolylene diisocyanate, diphenylmethane diisocyanate, diphenyl ether diisocyanate, hexamethylene diisocyanate or cyclohexane diisocyanate, and additionally a so-called isocyanate adduct comprising a polyol such as trimethylolpropane added to these diisocyanates.

According to the invention, a solution of a reactive polymer is blended with the above-mentioned polyfunctional isocyanate by a predetermined quantity, namely, a quantity sufficient for partially crosslinking the reactive polymer, and is carried on a substrate porous film, and then the reactive polymer, in other words, a functional group (such as an active hydrogen group) in the reactive polymer, is reacted with the polyfunctional isocyanate to partially crosslink the reactive polymer to form a partially crosslinked adhesive having adhesive properties. The adhesive-carrying porous film for use as a battery separator according to the invention comprises a porous film and the thus prepared partially crosslinked adhesive carried thereon.

It is preferred that the partially crosslinked adhesive obtained by partially crosslinking the reactive polymer has a gel fraction in a range of 5 to 80%. The gel fraction herein is a value defined as (C/(A+B))×100(%), which is obtained as follows. (A+B) part by weight of a reactive polymer composition comprising A part by weight of the reactive polymer and B part by weight of the polyfunctional isocyanate is carried on a porous film and reacted to partially crosslink the reactive polymer. The porous film is then immersed in toluene at a temperature of 23° C. for 7 days and then dried to leave the adhesive on the porous film in amount of C part by weight.

The method of obtaining a partially crosslinked adhesive having a gel fraction in a range of 5 to 80% is not specifically limited, but it may be obtained usually by blending 100 parts by weight of a reactive polymer with a polyfunctional isocyanate in a range of 0.1 to 10 parts by weight, heating and curing the reactive polymer until the polymer is so crosslinked as to be stabilized in properties. The heating and curing temperature and time therefor depend on a reactive polymer and polyfunctional isocyanate used, and these reaction conditions can be easily determined by experiments. A partially crosslinked reactive polymer or a partially crosslinked adhesive stabilized in properties is obtained by, for example, heating and reacting a reactive polymer with a polyfunctional isocyanate in an amount as mentioned above at a temperature of 50° C. for 7 days so that the crosslinking reaction is completed.

The reaction product thus obtained by reacting and partially crosslinking a reactive polymer with a polyfunctional isocyanate has adhesive properties, and therefore it is referred to as a partially crosslinked adhesive in the invention. The adhesive-carrying porous film comprises a substrate porous film and such a partially crosslinked adhesive having a gel fraction of 5 to 80% carried thereon. Thus, when an electrode is pressed against the porous film, the electrode is temporarily bonded or pressure-contacted to the porous film thereby providing an electrode/porous film laminate.

The electrode/porous film laminate thus obtained is such that when it is charged into a battery container and an electrolytic solution having a polyfunctional isocyanate dissolved therein is poured into the battery container, an unreacted reactive polymer in the partially crosslinked adhesive is further crosslinked by the polyfunctional isocyanate in the electrolytic solution while maintaining temporary bonding of the electrode/porous film to provide an electrode/separator adherend in which the electrode is firmly bonded to the porous film. The reactive polymer has been partially crosslinked in advance preferably so as to have a gel fraction of 5 to 80% as mentioned hereinbefore so that it is prevented or reduced from being eluted in an electrolytic solution and is thus effectively used for bonding an electrode to a porous film, thereby bonding the electrode and the porous film together more stably and more firmly. It is in particular preferred that a partially crosslinked adhesive has a gel fraction of 20 to 60%.

As a further advantage, an unreacted reactive polymer contained in the partially crosslinked adhesive carried on a porous film is not reacted and crosslinked any more so that it is stable and suffers no change of properties even when stored over a long period.

In order to carry a reactive polymer composition comprising a reactive polymer and a polyfunctional isocyanate on a substrate porous film, for example, the reactive polymer composition may be applied directly on the substrate porous film and then dried, or applied on a releasable sheet and dried, and thereafter transferred to the substrate porous film. The reactive polymer composition may contain an organic solvent such as methyl ethyl ketone or methyl isobutyl ketone, or inorganic fine powder such as heavy calcium carbonate or silica in an amount of 50% by weight or less in order to improve coating properties of the reactive polymer composition on the substrate porous film.

Further according to the invention, when a reactive polymer composition comprising a reactive polymer and a polyfunctional isocyanate is applied on a substrate porous film, it is preferred that it is applied partially, namely, for example, in linear, spotted, grid-like, striped or hexagonal pattern form, on the substrate porous film, and particularly the reactive polymer composition is applied in a range of 5 to 95% of the area of a surface of the substrate porous film so that firm bonding can be obtained between an electrode and a porous film (accordingly, a separator). The use of such an electrode/separator adherend further makes it possible to obtain a battery having superior properties.

As described above, a partially crosslinked adhesive having a gel fraction of 5 to 80% is carried on a substrate porous film to provide an adhesive-carrying porous film for use as a battery separator, and an electrode is put along and preferably pressed against the porous film while heated to a temperature of 50 to 100° C. to provide an electrode/porous film laminate.

An anode and a cathode used in the invention vary with a battery in which it is used. However, in general, sheet-like electrodes comprising an active substance and a conductive agent if necessary, supported on a conductive substrate by using a resin binder are used.

According to the invention, the use of such an electrode/porous film laminate makes it possible to efficiently manufacture a battery without causing mutual slip movement between an electrode and a porous film, thereby providing a battery having a superior safety in which the porous film itself functions as a high-performance separator.

The electrode/porous film laminate may be prepared as follows: a partially crosslinked adhesive is carried on both of the front and back surfaces of a substrate porous film, and electrodes, namely, an anode and a cathode are each press-contacted on both of the front and back surfaces so that they are temporarily bonded to the porous film to provide an electrode/porous film laminate; or a partially crosslinked adhesive is carried on only one surface of a substrate porous film, and an electrode, namely, either of an anode or a cathode is press-contacted on only one surface of the porous film so that it is temporarily bonded to the porous film to provide an electrode/porous film laminate. Needless to say, a laminate having a construction of cathode (anode)/porous film/anode (cathode)/porous film can also be formed.

The electrode/porous film laminate according to the invention is suitably used for manufacturing a battery. That is, after the electrode/porous film laminate is charged into a battery container, an electrolytic solution having a polyfunctional isocyanate dissolved therein is poured into the battery container and an unreacted reactive polymer in a partially crosslinked adhesive of the electrode/porous film laminate is reacted with the polyfunctional isocyanate in the electrolytic solution so that it further crosslinks, whereby the electrode is bonded to and integrated with the porous film to provide a battery having an electrode/separator adherend in which the porous film functions as a separator and the electrode is firmly bonded to the separator.

The amount of polyfunctional isocyanate dissolved in an electrolytic solution is usually in a range of 0.1 to 20 parts by weight with respect to 100 parts by weight of the reactive polymer carried on a porous film. When the amount of the polyfunctional isocyanate is less than 0.1 part by weight with respect to 100 parts by weight of the reactive polymer carried on the porous film, the reactive polymer is crosslinked insufficiently with a polyfunctional isocyanate so that there is not obtained firm bonding between the electrode and the separator in the resulting electrode/separator adherend. On the other hand, when the amount of the polyfunctional isocyanate is more than 20 parts by weight with respect to 100 parts by weight of the reactive polymer, the resultant crosslinked adhesive is so hard as to occasionally hinder close adhesion between the separator and the electrode in the resulting battery.

As described above, according to the invention, a partially crosslinked adhesive prepared by partially crosslinking a reactive polymer is carried on a porous film to provide a partially crosslinked adhesive-carrying porous film. An electrode is then placed along and pressed against the porous film while the porous film is heated to a temperature at which no deformation of the porous film occurs so that the adhesive is partially pressed into the electrode, in a sense, the electrode is thus temporarily bonded to a substrate porous film to form an electrode/porous film laminate. The laminate is then placed in a battery container and then an electrolytic solution having a polyfunctional isocyanate dissolved therein is poured into the battery container. The unreacted reactive polymer in the partially crosslinked adhesive is now reacted with the polyfunctional isocyanate in the electrolytic solution so that it is further crosslinked to provide an electrode/porous film adherend. That is, the electrode is really bonded to the porous film in a sense. Accordingly, in such an electrode/porous film adherend, the porous film and the electrode are firmly bonded.

A porous film in the electrode/porous film adherend thus obtained functions as a separator after being installed in a battery. In such an electrode/porous film adherend, the porous film (namely, the separator) has a low area heat shrinkage factor even under high temperatures, usually 25% or less, preferably 20% or less, and most preferably 15% or less.

Similarly to the electrode/porous film laminate described above, an electrode/separator adherend includes not merely an anode/separator/cathode adherend, but also an either of an anode or a cathode/separator adherend and a construction of cathode (or anode)/separator/anode (or cathode)/separator.

An electrolytic solution is a solution comprising an electrolytic salt dissolved in a solvent. Examples of the electrolytic salt employed include salts having hydrogen, alkali metals such as lithium, sodium or potassium, alkaline earth metals such as calcium or strontium, or a tertiary or quaternary ammonium salt as a cation component, and inorganic acids such as hydrochloric acid, nitric acid, phosphoric acid, sulfuric acid, fluoroboric acid, hydrofluoric acid, hexafluorophosphoric acid or perchloric acid, or organic acids such as organic carboxylic acid, organic sulfonic acid or fluorine-substituted organic sulfonic acid as an anion component. Among these, however, electrolytic salts having an alkali metal ion as a cation component are particularly preferably used.

As a solvent for an electrolytic solution, any can be used if it dissolves the electrolytic salts as mentioned above; examples of the non-aqueous solvent include cyclic esters such as ethylene carbonate, propylene carbonate, butylene carbonate or γ-butyrolactone, ethers such as tetrahydrofuran or dimethoxyethane, and chain esters such as dimethyl carbonate, diethyl carbonate or ethyl methyl carbonate. These solvents are used singly or as a mixture of two kinds or more.

INDUSTRIAL APPLICABILITY

The use of the adhesive-carrying porous film for use as a battery separator according to the invention makes it possible that an electrode/porous film (separator) laminate be easily obtained with no mutual slip therebetween, and in manufacturing a battery, an electrode/separator adherend in which the electrode is bonded to the porous film (the separator) firmly and stably with close adhesion is formed, so that a battery can be manufactured with favorable productivity while controlling the occurrence of defective products. The adhesive-carrying porous film for use as a battery separator according to the invention, after it has been incorporated into a battery, functions as a separator which does not melt or break, and has a small heat shrinkage under high temperatures, whereby a battery having a superior safety at high temperatures can be obtained.

EXAMPLES

The invention will be hereinafter described by referring to Examples, but the invention is not limited thereto. The thickness and porosity of a porous film were hereinafter measured in the following manner.

(The Thickness of a Porous Film)

The thickness was measured on the basis of a measurement by $1/10000$ mm-thickness gauge and 10000-times scanning electron microscope photograph of a cross section of a porous film.

(The Porosity of a Porous Film)

The porosity was calculated by the following expression from weight W (g) per unit area S ($cm^2$) and average thickness t (cm) of a porous film, and density d ($g/cm^3$) of resin composing a porous film.

$$\text{Porosity (\%)} = (1-(W/S/t/d)) \times 100$$

Example 1

Production of a Porous Film A

Sixteen parts by weight of a polyethylene resin composition comprising 8% by weight of powder of a ring-opening polymer of norbornene or polynorbonene (NORSOLEX NB, manufactured by ZEON Corporation, a weight average molecular weight of 2000000 or more), 12% by weight of a thermoplastic elastomer (TPE 824, manufactured by Sumitomo Chemical Co., Ltd.) and 80% by weight of a ultra-high molecular weight polyethylene resin having a weight average molecular weight of 3500000, and 84 parts by weight of a liquid paraffin were mixed to prepare a slurry. The slurry was kneaded by using a small-sized kneader at a temperature of 160° C. for about 1 hour. The obtained kneaded product was held between a pair of metal plates cooled to 0° C. and rolled and molded into a sheet while being cooled.

The sheet was then heat-pressed at a temperature of 115° C. until the thickness thereof became 0.5 mm. The sheet was then subjected to simultaneous biaxial stretching by 4.5×4.5 times in length and breadth at the same temperature. The sheet was then subjected to desolvating (solvent-removing) treatment by using heptane. The porous film thus obtained was heated in the air at a temperature of 85° C. for 6 hours and subsequently heated at a temperature of 118° C. for 1.5 hours to perform heat treatment of the porous film and crosslink a cross-linkable rubber (or polynorbornene) in the porous film, thereby providing a porous film A.

The porous film A had a thickness of 25 μm, a porosity of 50% and an average pore diameter of 0.1 μm and a heat-resistant temperature of 370° C. as measured by using a probe penetrating thermomechanical analyzer as described hereunder.

(Measurement of Heat-Resistant Temperature of a Porous Film by a Probe Penetrating Thermomechanical Analyzer)

A sample of a porous film 5 mm square was placed on a sample stage of a probe penetrating thermomechanical analyzer (EXSTAR 6000, manufactured by Seiko Instruments Inc.). A probe with the tip having a diameter of 1 mm was placed on the sample. The sample was heated from room temperature at a rate of 2° C./minute under a load of 70 gf applied on the probe and the change in the thickness of the sample was measured. A temperature at which the thickness of the sample decreased to a half of the thickness (the initial thickness) of the sample when the load was first applied on the sample was regarded as heat-resistant temperature of the sample.

| (Preparation of a reactive polymer) | |
|---|---|
| acrylonitrile | 10 parts by weight |
| methacrylic acid | 5 parts by weight |
| butyl acrylate | 30 parts by weight |
| ethyl acrylate | 60 parts by weight |
| polyethylene glycol alkyl phenyl ether | 3 parts by weight |
| n-dodecyl mercaptan | 0.08 part by weight |
| potassium persulfate | 0.3 part by weight |
| ion-exchange water | 300 parts by weight |

The above-mentioned blend was subjected to ordinary emulsion polymerization to provide an aqueous dispersion of a reactive polymer. The reactive polymer had a weight average molecular weight of about 850000 and a glass transition temperature of −13° C. Ten percent-hydrochloric acid was added to the aqueous dispersion of the reactive polymer so that the polymer is precipitated. The polymer was taken out, thoroughly washed with water, and then dried under reduced pressure.

One hundred parts by weight of the reactive polymer thus obtained was dissolved in a mixed solvent of toluene/methyl ethyl ketone (a weight ratio of 75/25) to prepare a solution of the reactive polymer having a concentration of 7%. Silica sand powder having an average particle diameter of 12 nm was added to the solution in an amount of five parts by weight in relation to 100 parts by weight of the reactive polymer and was uniformly dispersed in the solution. The solution was further blended with 0.3 part by weight of a trifunctional isocyanate prepared by adding 3 parts by mole of hexamethylene diisocyanate to 1 part by mole of trimethylolpropane to prepare a solution of a reactive polymer composition.

(Preparation of a Partially Crosslinked Adhesive-Carrying Porous Film)

The resulting solution of the reactive polymer composition was linearly applied onto a sheet of released paper by using a wire bar (a wire diameter of 0.2 mm) and dried. Using the resulting product, the reactive polymer composition was transferred to both of the front and back surfaces of the porous film A. The porous film was placed in a thermostatic chamber at a temperature of 50° C. for 7 days to partially react the reactive polymer in the reactive polymer composition with the trifunctional isocyanate to provide a porous film A on which a partially crosslinked adhesive having a gel fraction of 58% was carried.

(Preparation of Electrodes)

Lithium cobaltate ($LiCoO_2$) having an average particle diameter of 15 μm, graphite powder and polyvinylidene fluoride resin were mixed at a weight ratio of 85:10:5. The mixture was added to N-methyl-2-pyrrolidone to prepare a slurry having a solids concentration of 15% by weight. The slurry was applied in a thickness of 200 μm on the front surface of an aluminum foil having a thickness of 20 μm with a coater, and then dried at a temperature of 80° C. for 1 hour. Subsequently, the slurry was similarly applied in a thickness of 200 μm on the back surface of the aluminum foil, dried at a temperature of 120° C. for 2 hours and rolled with a roll press to provide a cathode sheet having a thickness of 200 μm.

Graphite powder and polyvinylidene fluoride resin were mixed at a weight ratio of 95:5, and the mixture was added to N-methyl-2-pyrrolidone to prepare a slurry having a solids concentration of 15% by weight. The slurry was applied in a thickness of 200 μm on the front surface of a copper foil having a thickness of 20 μm by a coater, and dried at a temperature of 80° C. for 1 hour. Subsequently, the slurry was similarly applied in a thickness of 200 μm on the back surface of this copper foil, dried at a temperature of 120° C. for 2 hours, and rolled with a roll press to provide an anode sheet having a thickness of 200 μm.

(Preparation of an Anode/Separator/Cathode Laminate)

The cathode sheet was put along the front surface of the porous film A on which the partially crosslinked adhesive was carried, and the anode sheet was put along the back surface thereof, and then the product was heated at a temperature of 80° C. under a pressure of 5 kg/cm² for 5 minutes thereby to provide a anode/porous film/cathode laminate in which the cathode sheet and the anode sheets were press-contacted or temporarily bonded to the porous film.

(Assembling of a Battery and Evaluation of the Properties of an Obtained Battery)

In an argon-substituted glove box, an electrolytic salt (lithium hexafluorophosphate, $LiPF_6$) was dissolved in a mixed solvent of ethylene carbonate/ethyl methyl carbonate (volume ratio: 1/2) so that the resulting electrolytic solution had a concentration of 1.2 mol/L of electrolytic salt. Further, 3 parts by weight of trifunctional isocyanate prepared by adding 3 parts by mole of toluene diisocyanate to 1 part by mole of trimethylolpropane were dissolved in 100 parts by weight of the electrolytic solution.

The anode/porous film/cathode laminate was charged into a 2016-size coin type battery can serving both as cathode and anode, and the electrolytic solution having the trifunctional isocyanate dissolved therein was poured into the coin type battery can, and the can was then sealed. Thereafter, the can was placed in a thermostatic chamber at a temperature of 50° C. for 7 days to crosslink an unreacted reactive polymer in the partially crosslinked adhesive carried on the porous film of the anode/porous film/cathode laminate with the trifunctional isocyanate, and bond the cathode and anode to the porous film, namely, the separator, thereby obtaining a coin type lithium Ion secondary battery having an anode/porous film (separator)/cathode adherend.

This battery was subjected to charge and discharge five times at a rate of 0.2 CmA, thereafter to charge at a rate of 0.2 CmA and further thereafter to discharge at a rate of 2.0 CmA. The battery was found to have discharge load properties of 87% in terms of a ratio of the discharge capacity at a rate of 2.0 CmA to the discharge capacity at a rate of 0.2 CmA.

(Measurement and Evaluation of Area Heat Shrinkage Factor of a Separator)

The cathode/porous film/anode laminate punched out into a predetermined size was impregnated with the electrolytic solution having the trifunctional isocyanate dissolved therein. The laminate was held between a pair of glass sheets and wrapped by a fluororesin sheet in order to suppress volatilization of the electrolyte liquid. A 50 g weight was placed on the wrapped laminate, and the laminate was placed in a thermostatic chamber at a temperature of 50° C. for 7 days to crosslink by the reaction of the reactive polymer in the partially crosslinked adhesive carried on the porous film of the cathode/porous film/anode laminate with the trifunctional isocyanate, so that the cathode and the anode were bonded to the porous film (that is, the separator in a battery), thereby providing a cathode/porous film/anode adherend.

The cathode/porous film/anode adherend thus obtained was held between a pair of glass sheets and placed in a drying chamber at a temperature of 200° C. for 1 hour. The glass sheets were removed from the cathode/porous film/anode and the separator (porous film) was separated from the adherend and the separator was read into a scanner. An area heat shrinkage factor measured 10% by comparing with the area of the initially used porous film.

Example 2

Production of a Porous Film B

Twenty parts by weight of a polyethylene resin composition comprising 6% by weight of powder of a ring-opening polymer of norbornene or polynorbornene (NORSOLEX NB, manufactured by ZEON Corporation, a weight average molecular weight of 2000000 or more) and 94% by weight of a ultra-high molecular weight polyethylene resin having a weight average molecular weight of 3000000 and 80 parts by weight of a liquid paraffin were mixed to prepare a slurry. The slurry was kneaded by using a small-sized kneader at a temperature of 160° C. for about 1 hour. The obtained kneaded product is held between a pair of metal plates cooled to 0° C. and rolled and molded to a sheet while being cooled.

The sheet was then heat-pressed at a temperature of 117° C. until the thickness thereof became 0.5 mm, and was additionally subjected to simultaneous biaxial stretching by 3.8×3.8 times in length and breadth at the same temperature. The sheet was then subjected to desolvating (solvent-removing) treatment by using heptane. The porous film thus obtained was heated in the air at a temperature of 85° C. for 6 hours and then heated at a temperature of 125° C. for 2 hours to perform heat treatment of the porous film and crosslink the cross-linkable rubber in the porous film, thereby providing a porous film B.

The porous film B had a thickness of 23 μm, a porosity of 45%, an average pore diameter of 0.07 μm and a heat-resistant temperature of 430° C. as measured by using the same probe penetrating thermomechanical analyzer as described above in the same manner.

(Evaluation of the Properties of a Battery and Measurement of Area Heat Shrinkage Factor of a Separator)

The porous film B on which a partially crosslinked adhesive having a gel fraction of 58% was carried was obtained in the same manner as in Example 1 except that the porous film B was used in place of the porous film A. An anode/porous film/cathode laminate was obtained in the same manner as Example 1 by using the porous film B on which a partially crosslinked adhesive was carried to assemble a coin type lithium ion secondary battery in the same manner as in Example 1 by using the laminate. The resulting battery was found to have discharge load properties of 89% and the separator was found to have a heat shrinkage factor of 16%, as measured in the same manner as Example 1.

Example 3

A reactive polymer composition was prepared in the same manner as in Example 1 except that 2 parts by weight of diphenylmethane diisocyanate was used in place of 3 parts by weight of trifunctional isocyanate prepared by adding 3 parts by mole of hexamethylene diisocyanate to 1 part by mole of trimethylolpropane. The reactive polymer composition was applied in a dotted state on both of the front and back surfaces of the same porous film A as in Example 1 in 30% of each area of the surfaces, and then the porous film was placed in a thermostatic chamber at a temperature of 50° C. for 7 days to obtain a porous film A on which a partially crosslinked adhesive having a gel fraction of 35% was carried.

A anode/porous film/cathode laminate was obtained in the same manner as Example 1 by using the porous film A thus obtained on which a partially crosslinked adhesive was carried to assemble a coin type lithium ion secondary battery in the same manner as in Example 1 by using the laminate. The resulting battery was found to have discharge load properties of 91% and the separator was found to have a heat shrinkage factor of 18%, as measured in the same manner as in Example 1

| Example 4 | |
|---|---|
| acrylonitrile | 40 parts by weight |
| 2-hydroxyethyl acrylate | 2 parts by weight |
| methyl methacrylate | 10 parts by weight |
| 2-ethylhexyl acrylate | 50 parts by weight |
| azobisisobutyronitrile | 0.3 part by weight |
| toluene | 300 parts by weight |

The above-mentioned blend was subjected to ordinary solution polymerization to obtain a toluene solution of a reactive polymer. The resulting reactive polymer was found to have a weight average molecular weight of about 300000 and a glass transition temperature of 5° C. One part by weight of trifunctional isocyanate prepared by adding 3 parts by mole of hexamethylene diisocyanate to 1 part by mole of trimethylolpropane was added to the reactive polymer solution in relation to 100 parts by weight of solid content of the solution to prepare a reactive polymer composition.

This reactive polymer composition was applied in a spotted state on a release stretching polypropylene resin film in 30% of a surface area thereof and dried. The release stretching polypropylene resin film was then placed on both of the front and back surfaces of the same porous film A as in Example 1, and pressed against the porous film and press contacted to the porous film while being heated at a temperature of 60° C. The resulting product was placed in a thermostatic chamber at a temperature of 50° C. for 7 days to obtain a porous film A on which a partially crosslinked adhesive having a gel fraction of 54% was carried and further having the release stretching polypropylene film on both of the front and back surfaces of the porous film.

After the release stretching polypropylene films were separated from the porous film A on which a partially crosslinked adhesive was carried, the cathode sheet was put along the front surface thereof and the anode sheet was put along the back surface thereof, and then heated and pressed at a temperature of 80° C. under a pressure of 5 kg/cm$^2$ for 5 minutes to obtain an anode/porous film/cathode laminate comprising the cathode and the anode sheets press-contacted or temporarily bonded to the porous film. A coin type lithium ion secondary battery was assembled in the same manner as Example 1 by using the anode/porous film/cathode laminate thus obtained. The resulting battery was found to have discharge load properties of 89% and the separator was found to have a heat shrinkage factor of 15%, as measured in the same manner as Example 1.

Example 5

Production of a Porous Film C

Fifteen parts by weight of a polyethylene resin composition comprising 20% by weight of EPDM (ESPRENE 512F, manufactured by Sumitomo Chemical Co., Ltd., the content of ethylidene norbornene is 4% by weight) and 80% by weight of a ultra-high molecular weight polyethylene resin having a weight average molecular weight of 1500000 and 85 parts by weight of liquid paraffin were uniformly mixed to prepare a slurry. The slurry was kneaded by using a small-sized kneader at a temperature of 160° C. for about 1 hour. The obtained kneaded product is held between a pair of metal plates cooled to 0° C. and rolled and molded to a sheet while being cooled.

The sheet was heat-pressed at a temperature of 115° C. until the thickness thereof became 0.4 mm, and was then additionally subjected to simultaneous biaxial stretching by 4.0×4.0 times in length and breadth at a temperature of 123° C. The sheet was then subjected to desolvating (solvent-removing) treatment by using heptane. A porous film thus obtained was heated in the air at a temperature of 85° C. for 6 hours and was then heated at a temperature of 116° C. for 1.5 hours to perform heat treatment of the porous film and crosslink a cross-linkable rubber in the porous film, thereby providing a porous film C.

The porous film C had a thickness of 24 μm, a porosity of 42%, an average pore diameter of 0.08 μm and a heat-resistant temperature of 320° C. as measured by using the same probe penetrating thermomechanical analyzer as described above in the same manner.

(Evaluation of the Properties of a Battery and Measurement of Area Heat Shrinkage Factor of a Separator)

The porous film C on which a partially crosslinked adhesive having a gel fraction of 58% was carried was obtained in the same manner as in Example 1 except that the porous film C was used in place of the porous film A. An anode/porous film/cathode laminate was obtained in the same manner as in Example 1 by using the porous film C on which a partially crosslinked adhesive was carried to assemble a coin type lithium ion secondary battery in the same manner as Example 1 by using the laminate. The resulting battery was found to have discharge load properties of 86% and the separator was found to have a heat shrinkage factor of 12%, as measured in the same manner as in Example 1.

Example 6

| N,N-diethyl acrylamide | 50 parts by weight |
| butyl acrylate | 32 parts by weight |
| acrylonitrile | 15 parts by weight |
| 4-hydroxybutyl acrylate | 3 parts by weight |
| azobisisobutyronitrile | 0.2 part by weight |
| ethyl acetate | 150 parts by weight |

The above blend was subject to ordinary solution polymerization to obtain an ethyl acetate solution of a reactive polymer. The reactive polymer had a weight average molecular weight of about 490000 and a glass transition temperature of 35° C. A porous film A on which a partially crosslinked adhesive having a gel fraction of 52% was carried was obtained in the same manner as in Example 1 except that a reactive polymer solution was prepared by adding 1 part by weight of trifunctional isocyanate prepared by adding 3 parts by mole of hexamethylene diisocyanate to 1 part by mole of trimethylolpropane to the reactive polymer solution in relation to 100 parts by weight of solid content of the reactive polymer solution.

An anode/porous film/cathode laminate was obtained in the same manner as in Example 1 by using the porous film A on which a partially crosslinked adhesive was carried to assemble a coin type lithium ion secondary battery in the same manner as Example 1 by using the laminate. The resulting battery was found to have discharge load properties of 88% and the separator was found to have a heat shrinkage factor of 9%, as measured in the same manner as Example 1

Comparative Example 1

A partially crosslinked adhesive was not carried on the same porous film A as in Example 1, and the porous film was used as it was for assembling a battery. That is, the cathode sheet was put along the front surface of the porous film and the anode sheet was put along the back surface thereof to form a laminate.

A coin type lithium ion secondary battery was assembled in the same manner as in Example 1 except that the above-mentioned laminate was used in place of the electrode/porous film laminate in Example 1. The resulting battery was found to have discharge load properties of 95% and the separator was found to have a heat shrinkage factor of 72%, as measured in the same manner as in Example 1.

Comparative Example 2

Production of a Porous Film D

Fifteen parts by weight of a polyethylene resin composition comprising 60% by weight of polyethylene resin having a weight average molecular weight of 200000 and 40% by weight of a ultra-high molecular weight polyethylene resin having a weight average molecular weight of 1500000 and 85 parts by weight of a liquid paraffin were mixed to prepare a slurry. The slurry was kneaded by using a small-sized kneader at a temperature of 160° C. for about 1 hour. The obtained kneaded product is held between a pair of metal plates cooled to 0° C. and rolled and molded to a sheet while being cooled.

The sheet was heat-pressed at a temperature of 115° C. until the thickness thereof became 0.5 mm, and was then additionally subjected to simultaneous biaxial stretching by 4.0×4.0 times in length and breadth at the same temperature. The sheet was then subjected to desolvating (solvent-removing) treatment by using heptane. A porous film thus obtained was heated in the air at a temperature of 85° C. for 6 hours and subsequently heated at a temperature of 116° C. for 1 hour to obtain a porous film D.

The porous film D had a thickness of 24 μm, a porosity of 39%, an average pore diameter of 0.1 μm and a heat-resistant temperature of 160° C., as measured by using the same probe penetrating thermomechanical analyzer as described above in the same manner.

(Evaluation of the Properties of a Battery and Measurement of Area Heat Shrinkage Factor of a Separator)

The porous film D on which a partially crosslinked adhesive having a gel fraction of 58% was carried was obtained in the same manner as in Example 1 except that the porous film D was used in place of the porous film A in Example 1. An anode/porous film/cathode laminate was obtained in the same manner as Example 1 by using the porous film D on which a partially crosslinked adhesive was carried to assemble a coin type lithium ion secondary battery in the same manner as in Example 1 by using the laminate. The resulting battery was found to have discharge load properties of 90%, as measured in the same manner as Example 1.

The measurement of area heat shrinkage factor of the separator in the battery was attempted; however, the separator was broken, so that the area heat shrinkage factor could not be measured.

The invention claimed is:

1. An adhesive-carrying porous film for use as a battery separator, which comprises:
    a substrate porous film such that when a probe of a probe penetrating thermomechanical analyzer, said probe having a diameter of 1 mm, is placed on the porous film under a load of 70 g to measure a thickness thereof while heating the porous film from room temperature at a rate of 2° C./minute, a temperature at which the thickness of the porous film decreases to a half of the thickness of the porous film when the probe was initially placed thereon is 200° C. or more; and
    a partially crosslinked adhesive carried on the substrate porous film, and having a gel fraction in a range of 5 to 80%, the partially crosslinked adhesive being prepared by carrying on the substrate porous film a reactive polymer having a functional group capable of reacting with a polyfunctional isocyanate and a polyfunctional isocyanate in such a quantity sufficient for the reactive polymer to be partially crosslinked, and then by reacting the reactive polymer with the polyfunctional isocyanate.

2. The adhesive-carrying porous film according to claim 1, wherein the substrate porous film is prepared from a polyolefin resin composition comprising a polyolefin resin having a weight average molecular weight of at least 500000 and a crosslinked product of a cross-linkable rubber having double bonds in the molecular chain.

3. The adhesive-carrying porous film according to claim 2, wherein the cross-linkable rubber is an ethylene-propylene-ethylidene norbornene ternary copolymer.

4. The adhesive-carrying porous film according to claim 2, wherein the cross-linkable rubber is a polynorbornene.

5. An electrode/porous film laminate comprising an electrode press-contacted to the adhesive-carrying porous film according to any one of claims 1 to 4.

6. An electrode/porous film adherend comprising an electrode bonded to a porous film prepared by reacting a reactive polymer in the electrode/porous film laminate according to claim 5 with a polyfunctional isocyanate and further crosslinking a partially crosslinked adhesive.

7. The adhesive-carrying porous film according to claim 1, wherein the reactive polymer has carboxyl groups or hydroxyl groups as the functional group capable of reacting with an isocyanate group.

* * * * *